H. W. LEONARD.
ELECTRIC CURRENT CONTROLLER.
APPLICATION FILED DEC. 12, 1904.

1,064,749.

Patented June 17, 1913.

3 SHEETS—SHEET 1.

H. W. LEONARD.
ELECTRIC CURRENT CONTROLLER.
APPLICATION FILED DEC. 12, 1904.

1,064,749.

Patented June 17, 1913.

3 SHEETS—SHEET 3.

Witnesses
Chas. D. King.
L. A. Dager.

H. Ward Leonard, Inventor
By his Attorney
C. W. Edwards.

UNITED STATES PATENT OFFICE.

HARRY WARD LEONARD, OF BRONXVILLE, NEW YORK.

ELECTRIC-CURRENT CONTROLLER.

1,064,749.

Specification of Letters Patent.   Patented June 17, 1913.

Application filed December 12, 1904.   Serial No. 236,439.

*To all whom it may concern:*

Be it known that I, HARRY WARD LEONARD, a citizen of the United States, residing at Bronxville, in the county of Westchester and State of New York, have invented certain new and useful Improvements in Electric-Current Controllers, of which the following is a full, clear, and exact specification.

My invention relates to the control of the current through a device by means of the electromotive-force upon the terminals of the device, or upon the terminals of a device functionally related thereto. An instance of the application of my invention is the control of the current through a motor armature by means of the electromotive-force upon the armature terminals.

The principal object of my invention is to control the current through the device so that the current will be automatically maintained within such limits as are required for the desired operation of the device.

My invention has many applications and will be useful in connection with a great variety of devices, among which may be named, electric motors, storage batteries, electromagnets, electric furnaces and other forms of electro heating devices, rheostats, electric lights, electric signaling devices.

I will describe the invention generally as applied to an electric motor, the automatic controller being employed to automatically control the current through the motor armature and accelerate the motor from rest to full speed.

Figure 1:
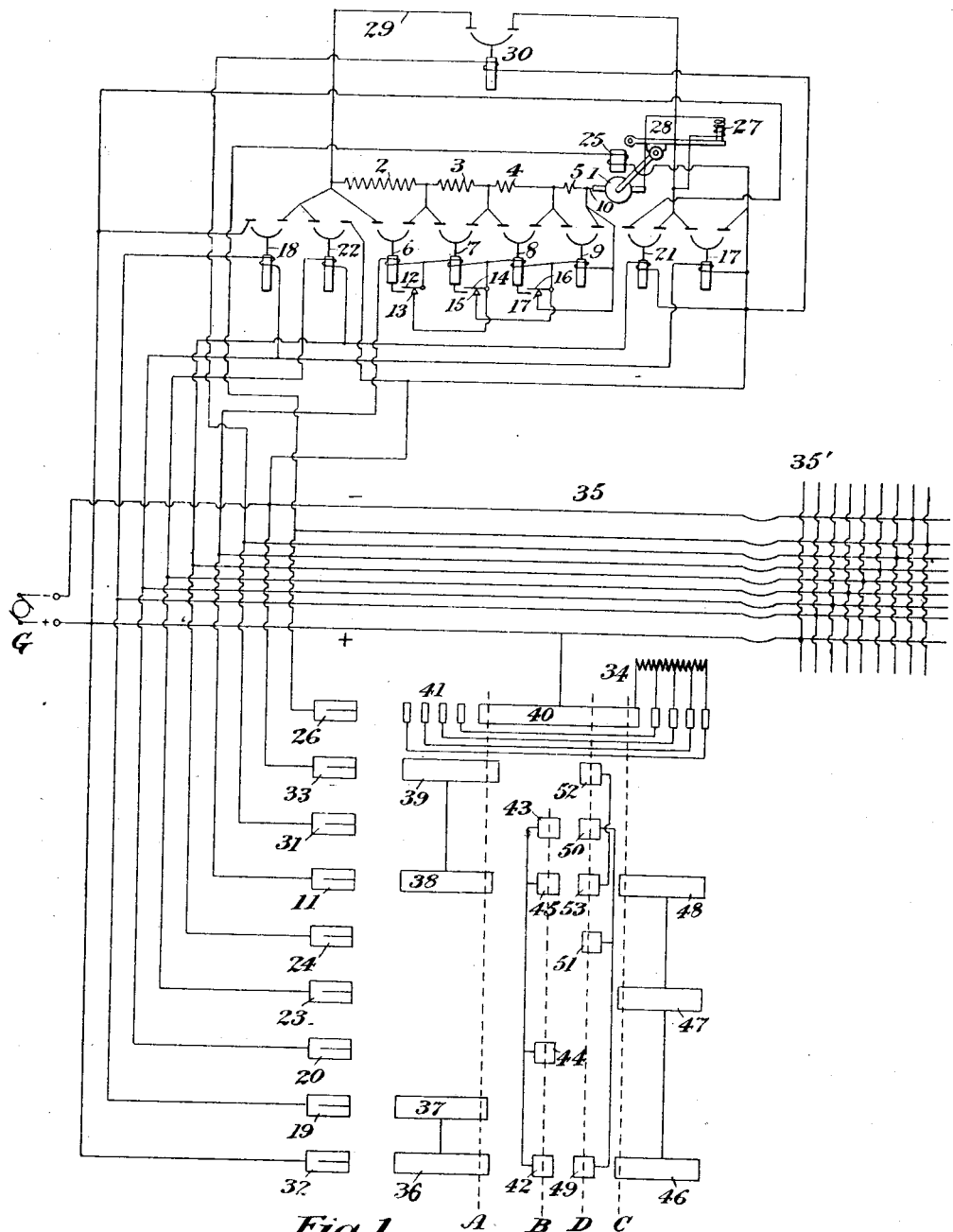
Figure 2:
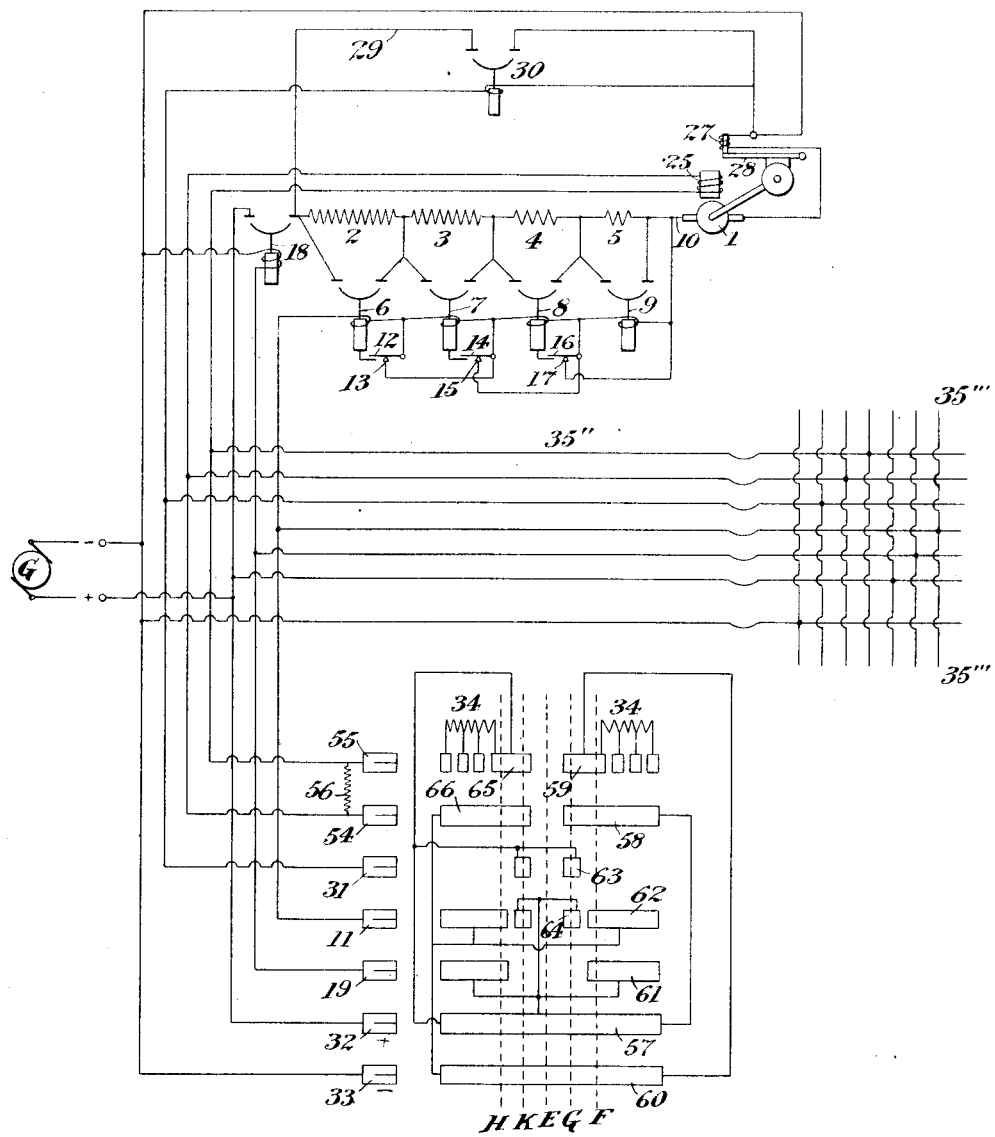
Figure 3:
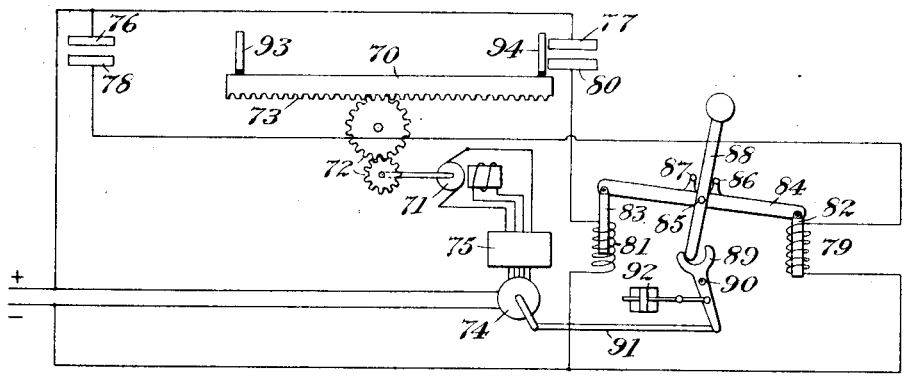
Figure 4:
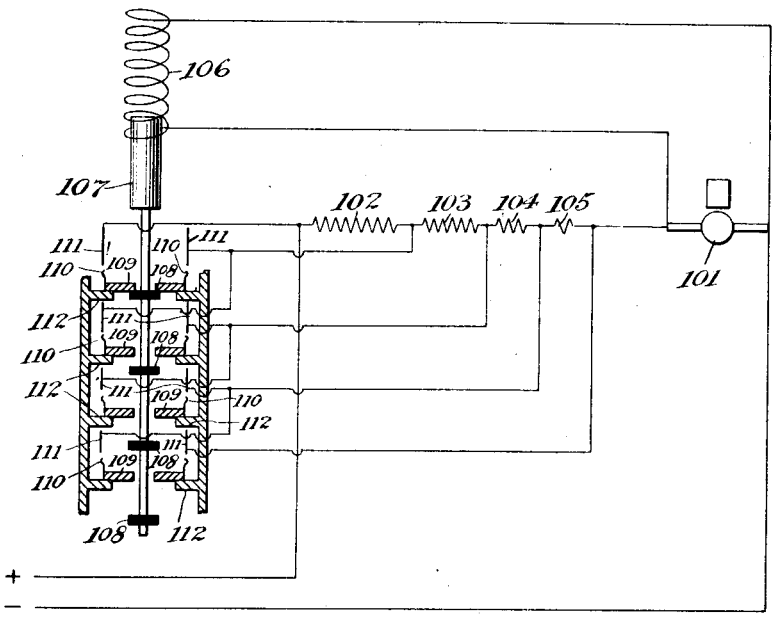

Figure 1 is a diagrammatic view of an application of my invention to motor control and as adapted for multiple unit control; Fig. 2 is a similar view of a modified arrangement; Fig. 3 is a similar view showing my invention applied to the operation of a planer; and Fig. 4 is a diagrammatic view of a modification.

Referring to Fig. 1, the upper portion in general represents the motor, its series resistance, controlling automatic switches; the lower portion illustrates the development of a controlling switch of drum type and the central portion shows the leads which may be run from one set of apparatus to another and the necessary connections when my invention is used in a multiple control system. The motor to be controlled is indicated at 1 and in series therewith is shown the starting resistance divided into a suitable number of steps as 2, 3, 4 and 5. Each step is provided with an electromagnetic switch as 6, 7, 8 and 9 which, when closed, short circuits the corresponding step of resistance. The exciting coils for these switches are connected in series with each other and from the terminal 10 of the armature to the finger 11. The latter engages contacts on the drum and connects to the other side of the line. From a point between the coils of switches 6 and 7 extends a connection to a pivoted switch 12 which by the action of gravity, or spring pressure, engages a contact 13 which is connected to a point between the coils of switches 7 and 8. From this connection extends a pivoted switch 14 which engages a contact 15 by force of gravity or other pressure. Similarly the contact 15 is connected to a point between coils of switches 8 and 9 and to the other pivoted switch 16. This pivoted switch engages the contact 17 which is connected to the other side of the coil of switch 9. The cores of switches 6, 7 and 8 carry projections as indicated, which projections are adapted to open switches 12, 14 and 16 when switches 6, 7 and 8 are respectively closed. At 17 and 18 are indicated two electromagnetic switches adapted to close the armature circuit for running in one direction. The coils of these switches are connected in series with each other and from one side of the line (negative being indicated) to the finger 19 of the drum controller. From a point between the coils of switches 17 and 18 extends a connection to the finger 20. At 21 and 22 are indicated two additional electromagnetic switches for closing the armature circuit when running in the opposite direction. The coils of these switches are shown connected in series with each other and from the negative side of the line to finger 23 of the drum controlling switch. From a point between the coils of switches 21 and 22 a connection extends to the finger 24. The field 25 of the motor is connected from the negative side to the finger 26. In series with the motor armature is a coil 27, the core of which is connected to a pivoted brake lever 28, having a braking surface engaging a brake wheel mounted upon the armature shaft as indicated, or some part mechanically connected therewith. When sufficient current passes through coil 27 the brake lever will be raised and the armature free to revolve. From the outside of the armature resistance, a braking circuit 29 extends through an electromagnetic switch 30 to the other terminal of the armature and as shown includes the coil 27. The coil of the switch 30 is connected from the negative line to the contact finger 31. At the left of the diagram are represented a source of electric energy G and the positive and negative supply terminals, and which in the case of operating electric vehicles may represent moving contacts. The positive supply wire is shown connected to contact finger 32 and the negative to finger 33. The figure shows the arrangement of the drum contacts for the different portions and at 34 are represented sections of a field resistance for weakening the field to obtain increased speeds. The functions of the different contacts of the drum controller will be understood in connection with the explanation of operation.

In the present case I have shown my invention as applied to the operation of electrically propelled vehicles and for multiple unit control. The series of wires indicated at 35 extend from car to car, and similar motors and controlling devices on the different vehicles are connected thereto in the same manner as shown. Such additional apparatus and connections are not shown as they would be a duplication of the present figures and are therefore unnecessary. It is sufficient to state that the corresponding parts will be connected to the corresponding through wires. At the right of the figure are shown the connecting leads 35' extending from the through wires and adapted to be connected to the second set of apparatus as already explained.

Assume the motor to be at rest and that the controlling switch is thrown to the forward position, the fingers then making contact on the line marked A on the drawing. The coils of switches 17 and 18 will then be connected in series across the line, current passing from the positive line to finger 32, drum contacts 36 and 37, finger 19 through the coils referred to and then to the negative line. This will cause the closing of switches 17 and 18 and current will then pass from positive line through switch 18, through all steps of resistance, through the motor armature, coil 27, and switch 17 to negative line. The current which passes will be sufficient to raise the brake lever 28 and to start the motor. The field 25 of the motor is excited at all positions by current from the positive line to contact 40, finger 26, through the field coil to the negative line. The coils of switches 7, 8 and 9 are now short-circuited by switches 12, 14 and 16 and current passes from terminal 10 of the motor armature through switches 16, 14 and 12, through coil of switch 6 to finger 11, contacts 38, 39, finger 33 to the negative side. Coil of switch 6 is therefore subject to the counter electromotive-force of the motor armature and the current which passes through said coil is determined by the counter-electromotive force across the motor armature terminals. As the motor armature accelerates, its own electromotive force, or counter volts, will gradually increase in amount. if the source of supply has a constant electromotive force, as is usual. When the counter volts have risen to a predetermined amount with a corresponding reduction in the current, the electromagnetic switch 6 becomes sufficiently energized to cause it to close and the first step 2 of the resistance is short circuited. The closing of switch 6 removes switch 12 from contact 13 and the coil of switch 7 is then placed in circuit with the coil of switch 6 across the armature terminals. This will lessen the exciting current of switch 6 for the time being, but the amount of current will be sufficient to keep it closed. The cutting out of resistance 2 will cause an increased current to flow through the motor armature and increase its speed. This in turn increases the counter electromotive force and reduces the armature current until finally the counter volts reach such an amount that the exciting current of the electromagnetic switch 7 is sufficient to close the same. This short circuits step 3 of the resistance and opens switch 14 which throws the exciting coil of switch 8 in series with the coils of switches 6 and 7 and across the armature terminals. The increased armature current again increases the speed and the counter volts increase, causing the armature current to gradually fall. The counter volts are finally sufficient to cause the exciting current of switch 8 to close said switch. This short circuits resistance 4 and by opening switch 16 places the coil of switch 9 in series with the coils of the other switches. The previously described operation continues until switch 9 closes and all of the resistance steps are finally automatically short circuited and the motor runs at a high speed. If desired the speed may be still further increased by moving the drum controller so that the finger 26 successively engages the contacts 41. This places sections of the resistance 34 in the field circuit giving a weakened field and increased speed.

It will be noted that by adjusting the ohms of the steps and the electromotive forces needed to cause the several electromagnets to close their resistance short-circuiting switches, the maximum current and the minimum current during acceleration of the motor can be controlled within limits and may, if desired, be varied for the several steps relative to each other. In accelerating a body, especially a passenger vehicle, for example, such as a passenger elevator, it is desirable to accelerate it in a certain definite manner determined by various considerations, such as maximum energy, time, comfort of passengers, strain on mechanism, but having determined the best time intervals for cutting out the resistance with a certain load, it is important to accelerate the vehicle in this best way each time, independently of the operator, and this I can accomplish by my invention. Thus I can secure a smoother acceleration, with less maximum energy, less total work and in a shorter time than would be usually the case by the former methods of controlling the rheostat.

To retard the moving load I prefer to place the motor armature in a local circuit containing a rheostat, preferably the same one used for acceleration. The electro-magnets for controlling the retarding effects are preferably energized by an electromotive force which is the difference between the line electromotive force and the counter electromotive force of the motor so that as the motor counter electromotive force falls the electromotive force on the electromagnets rises. Thus referring to Fig. 1, assume the drum controller to be turned to such position that the fingers make contact on the line marked B. In passing to the new position all the electromagnetic switches will be deënergized and will be open. At the position B however, switch 30 will be closed, its coil receiving current from the positive line through finger 32, contacts 42, 43, finger 31 and through the coil to the negative line. This switch closes the braking circuit 29, the current from the armature passing through the coil 27, conductor 29 and the various steps 2, 3, 4 and 5 of the resistance. At position B current also passes from positive line to finger 32, contacts 42, 44, finger 20 through coil of switch 17 to negative line. Switch 17 will therefore be closed. Current also passes from positive line through finger 32, contacts 42, 45, finger 11 to the coil of switch 6. As the switches 12, 14 and 16 are closed, it follows that the coil of switch 6 is in circuit with the motor armature and is subjected to an electromotive force which is equal to the difference between the line electromotive force and the counter electromotive force of the motor, the path of the current being from the position line through the coil of switch 6, through the motor armature and against its counter electromotive force, and then through switch 17 to negative line. The motor continues to rotate momentarily at a high speed and hence its counter volts cause a large current to flow in the local loop which quickly retards the motor and thereby causes its counter volts to fall. The difference between the line electromotive force and the counter electromotive force of the motor therefore increases and soon becomes sufficient to close switch 6. This cuts out the first step 2 of the resistance causing a corresponding increase in the braking current which gradually falls off again as the counter volts decrease. As the coil of switch 7 is now in circuit with coil of switch 6 and with the armature, it is subjected to the increasing difference between the line volts and the counter volts and when it receives a predetermined electromotive force it will close and short circuit the step 3 of the resistance which again brings the braking current to its maximum. The action is repeated with switches 8 and 9 until the motor armature is finally on short circuit which, with the friction of the mechanism, is usually sufficient to bring all parts smoothly to rest. It may be desirable at times to provide a brake to hold the parts at rest and for this purpose I have shown the brake lever 28 controlled by the solenoid 27. When the current through the motor armature and coil 27 is very slight, the brake lever will not be retained by the coil and the brake will be applied.

For operating the motor in the opposite direction, the fingers will make contact on line C. In this position current will pass from positive line, through finger 32, contacts 46, 47, finger 23, coils of switches 22 and 21 to negative line. Switches 22 and 21 will therefore be closed and current will pass through the armature and starting resistance from the line in a direction opposite to that previously considered. As the field excitation remains the same, the direction of rotation is reversed. It will be seen that the coils of switches 6, 7, 8 and 9 are now connected from terminal 10 of the armature, which is now negative, to the positive side through finger 11, to contact 48 and out through finger 32. The coils of these switches are therefore connected across the armature terminals and the electromotive force applied to them is determined by the counter volts of the motor. The current passing through the armature will be automatically controlled, as previously described, as the speed increases, each switch successively closing and short circuiting a step of the resistance and at the same time removing the short circuit of the coil of the adjacent switch. Increased speed may be obtained by weakening the field, as previously described. In order to brake the motor when running in this direction, the fingers will make contact on line D. In passing to this position, all of the electromagnetic switches will be opened. At position D switch 30 will be closed, current passing from positive line to contacts 49, 50, finger 31 through the coil of switch 30 to negative line. The braking circuit of the armature will consequently be closed through the resistance. Current will also pass from positive line to contacts 49, 51, finger 24, coil of switch 21 to negative line, thus closing switch 21. Connection will also be made from negative line through finger 33 to contacts 52, 53, finger 11, through the coils of switches 6, 7, 8 and 9 to the motor armature and through switch 21 to positive line. It is apparent that the coil of switch 6 will be subjected to the difference of electromotive force between the line voltage and the counter volts and when the motor has been retarded to a certain amount this switch will close, cutting out resistance 2 and increasing the current in the local circuit and at the same time removing the short circuit from coil of switch 7. Switches 7, 8 and 9 will successively close as previously described and the motor be gradually brought to rest. The brake lever 28 will be automatically applied when the armature current becomes slight, or when it ceases to flow. This may be designated the "no-current" brake.

It will be understood that as many steps in the starting resistance may be used as desired. It will also be understood that resistances may be added where necessary in the circuits of the electromagnetic switches. In some cases I may use a series of relays responsive to different increasing voltages, which relays, when they respond, will energize the windings of the rheostat switches, they being merely intermediate devices for accomplishing the same purpose.

It will be noted that by my invention I can automatically accelerate with a torque which is practically constant within predeterminable limits, and can retard with a torque which is similarly practically constant. This gives a very perfect acceleration and retardation, and contributes greatly to the comfort of passengers, and greatly reduces the strains and wear and tear on the mechanism.

In order to secure smooth acceleration or retardation, or both, I prefer to arrange the resistance in steps which are so graduated that each successive step of the series represents substantially the same definite percentage of the total resistance in the circuit at the time that step is cut out. By this means I obtain a constant increment of current each time a step of resistance is cut out, provided that the current in the circuit after the acceleration, due to cutting out one step, falls to approximately the same current value before the next step is cut out and the load is substantially constant, as is the case in elevator practice and many other kinds of service. This may be explained as follows:

After each acceleration, the counter volts will rise and the current will fall in the circuit until a stable condition is reached. The current then flowing will be due to the net effective voltage acting in the circuit. With a practically constant load and practically constant field, this current after acceleration each time will be substantially constant. If when this stable condition is reached, we cut out say one-half of the ohms in a circuit, the current will constantly rise to approximately double its value, that is, the constant increment of current will be 100% under the stable conditions named. Similarly if we cut out ⅓ of the resistance the constant increment of current will be 50% above the normal current represented by conditions of stable speed. After the ohms have been reduced in this way to a satisfactory minimum the remaining resistance can be cut out in one step.

While my invention is likely to be used most on circuits of constant electromotive force and continuous currents, it can be employed upon currents having variable electromotive force, and, of course, it may also be employed when the current is alternating or other form of current, provided such form of current and the magnetic devices are of such a character as to be capable of utilizing my invention.

One important application of my invention will be for the operation of an electrically propelled vehicle, such as a trolley car, or a storage battery car, or other form of electrically driven car, whether on rails or other form of road bed. My invention will be especially useful for the simultaneous control of a number of different motors from one point and by one operator. For example, as a multiple unit control for a train of cars. This is illustrated in Fig. 1. In Fig. 1 there are nine wires indicated which will be the train controlling system for a multiple unit train system. There can be any desired number of controllers along the train and the several motors can be simultaneously and similarly controlled by the operator from any one of these controlling stations.

In order to prevent possible conflict of use of several controllers, I prefer to have but one handle, which the operator takes with him and which can only be removed or inserted when the controller is in its "stop" position or some equivalent protective position. It will be observed that any tendency of any automatic controller at any stage of the acceleration or retardation to continually act before another one acts, is automatically corrected by the fact that the counter volts on that first motor will then be less than that upon the second one and hence as the train accelerates the second one will act to cut out resistance before the first one acts to cut out another step.

I prefer to use a field such as a shunt field, which is practically unaffected by the armature current. In other multiple control systems many complicated automatic corrective devices become necessary which my invention makes unnecessary.

It will be observed that my invention provides an automatic "no voltage" protection. That is, a failure of the supply electromotive force or a break in the circuit due, for example, to a trolley losing its contact will immediately cause the insertion of the resistance and the opening of the armature circuit, and the armature will always be protected either by resistance or counter volts in the armature circuit.

I prefer to make the solenoid windings all identical and so connect them that they will operate successively as the electromotive force rises on the armature of the motor. But I may vary the windings or the connections in any way desired so long as they respond automatically to properly cut out the resistance.

In Fig. 1 I have shown an arrangement of apparatus in which the reversal of direction of rotation is obtained by reversing the armature current. In Fig. 2 is shown a very similar construction in which however, the reversal of direction of rotation is obtained by reversing the field of the motor. Parts similarly lettered in the two figures represent corresponding parts.

At 1 is indicated the motor armature to be driven, and in its circuit are shown in series the steps 2, 3, 4, 5 of the starting or retarding resistance. The switches 6, 7, 8, 9 are arranged as explained in connection with Fig. 1, being connected in series from the terminal 10 of the armature to finger 11 of the drum controller. The parts 12, 13, 14, 15, 16, 17 are also similarly arranged. One side of the motor armature is shown as connected to the negative supply line through the coil 27. At 18 is shown a main switch for connecting the other side of the armature to positive line. The coil for operating switch 18 is connected from negative line to finger 19. The field winding 25 of the motor is connected from finger 54 to finger 55. The brake circuit 29 is completed through the motor armature and resistances when the switch 30 is closed. The coil of the switch 30 is connected from negative line to finger 31. Positive line is connected to finger 32 and negative line to finger 33. Resistances are shown at 34 adapted to be inserted in the field circuit for obtaining high speeds. The through wires for multiple unit control are indicated at 35" and the connecting leads for another and similar set of apparatus are shown at 35'''.

In order to avoid any objectionable field discharge upon opening the field circuit of the motor, I may use any of the well known methods of providing a circuit for such discharge at the time the field current is broken. As one form of this arrangement I have shown a resistance 56 connected across the terminals of the field. In practice I prefer to arrange the controller so that this resistance will only be in circuit temporarily at the time of breaking the field circuit.

The operation is as follows: Assume the drum controller to be thrown from the "off" position at E and so that the fingers will make contact on line F. In this position the field 25 will be excited, current passing from positive line, through finger 32, contacts 57, 58, finger 54, field 25, finger 55, contacts 59, 60, finger 33 to negative line. The main switch 18 will be closed due to current passing in its coil from positive line, through finger 32, contacts 57, 61, finger 19, through coil of switch 18 to negative line. Current will also pass through coils of switches 6, 7, 8 and 9 in the manner previously explained, around the armature from terminal 10 to finger 11, contacts 62, 60, finger 33 to negative line or the negative side of the armature. The action of switches 6, 7, 8 and 9 to successively cut out the resistance will take place as previously explained bringing the armature to a high speed automatically. Further increase of speed may be obtained if desired by turning the controller so that the fingers will occupy positions to the right of F thus inserting sections of resistance 34 in the field circuit. To retard or stop the motor, the fingers are made to contact on line G. In passing to this position, all the automatic switches open. The field is excited as before. In position G switch 30 will be closed by current passing from positive line, through finger 32, contacts 57, 63, finger 31, coil of switch 30 to negative line. The brake circuit will therefore be established. Current may also pass from positive line, through finger 32, contacts 57, 64, finger 11, coils of switches 6, 7, 8 and 9, armature 1 to negative line. It is therefore understood that the coils of these switches will be subjected to an electromagnetic force equal to the difference between the line voltage and the counter electromotive force of the motor, and the resistances 2, 3, 4, 5 will be automatically cut out as explained with reference to Fig. 1, bringing the motor rapidly and smoothly to rest. Rotation in the reverse direction is obtained when the fingers make contact on line H. The circuits for this position are the same as for position F, except that the direction of current through the field coil 25 is reversed giving a reversed rotation of the motor, the operation in other respects taking place as before. In position H the field current passes from positive line through finger 32, contacts 57, 65, finger 55, field coil 25, finger 54, contacts 66, 60 to negative line. Increased speed in this direction may be obtained by weakening the field, as by inserting sections of the field resistance 34. In order to retard or stop the motor when running in this direction, the fingers will make contact on line K. It will be seen that the connections in this position are similar to those in position G, except that the field remains reversed, and the operation is entirely similar.

My invention may be embodied in a great variety of constructions and arrangements. In some cases the electromotive force supplying the electromagnets need not be the electromotive force upon the terminals of the device controlled, but may be an electromotive force dependent upon it, such as the electromotive force which is the difference or sum of two electromotive forces, one of which is the electromotive force on the device controlled. Or in some cases it may be in a separate circuit but affected by the electromotive force on the device controlled. In some cases the electromotive force controlling the automatic switches may be independent of the electromotive force upon the device controlled, but dependent upon the current through, or electromotive force upon, a device which is affected when there is a change of electromotive force on the device to be controlled, or a change in the current through the device.

Generally speaking, I utilize a change in the electromotive force upon the device to be controlled, or a change in the electromotive force on a second device which responds to a change in the energy supplied to the device which is to be controlled, so as to automatically affect the electric energy taken by the device to be controlled. When I wish to continually control the current within limits I prefer to use as the electromotive force for the magnetic switches, the electromotive force upon the terminals of a resistance in series with the device. Sometimes the electromotive force upon the motor armature terminals will control the resistance in the field circuit of a generator supplying the motor, or the field circuit of the motor itself, by means of the electro-magnetic switches.

One important application of my invention will be the operation of various forms of machine tools and apparatus having similar requirements. A good example will be an electrically driven lathe. Such a lathe must be frequently started, stopped, reversed, and must be varied over a wide range of speed while in service. When such a lathe is operated and controlled by former methods, a great deal depends upon the skill of the individual operator. The operator may operate his present type of controller so as to take an improperly large current at some moment during the acceleration, in which case he may open a protective magnetic circuit breaker or blow a fuse. This would result in a waste of time in getting such overload devices ready for him to start up again. Such an excessive current also tends to do damage by the attendant sparking, and may produce detrimental electrical or mechanical strains. If the operator does not take an excessive current he may take a current so unnecessarily small as to waste time in the period of acceleration. Similarly he may waste time during the retardation and stopping period and may subject the apparatus to improper usage. In the operation of such a machine tool and other parallel cases it is of the greatest importance, as regards the commercial efficiency of the apparatus and its earning capacity, that the time during which the tool is not producing, be reduced to a minimum. That is, the startings, stoppings, reversings and similar periods should be made as short as practicable, giving due consideration to the maximum energy desirable to use, the depreciation of apparatus, reliability of source, and other factors influencing the cost. By the employment of my invention a great improvement can be effected in the commercial results obtainable from such electrically operated apparatus and the importance of having a skilled operator of good judgment is reduced to a minimum.

In many kinds of mechanical operations, the operator goes through a certain cycle of operations by means of a lever or equivalent controlling device, in such cases my invention can be usefully employed. In many instances the apparatus, or substance moved by the electric motor will by its movement to a predetermined amount or condition, automatically move the controller for my apparatus, so that my invention may be employed to automatically perform certain work. For example, the rolls of a rolling mill may be driven by an electric motor and whenever the work, or the conveyer for the work, reaches a certain position the controlling lever will be automatically moved so as to retard and reverse the rolls and then accelerate them in the reverse direction. This is repeated at each end of the stroke. Similarly a planer can be automatically controlled. Similarly a pump can be automatically started up when a predetermined change in the level of water causes a float or equivalent device to move the controller lever to the starting position. The pump will then continue to operate until the float has been moved sufficiently to move the controlling lever to the "stop" position. Similarly a pile driver could be automatically operated, the weight in the movement engaging the controlling levers at each end of the stroke.

An application of my invention to an electrically driven planer is illustrated in Fig. 2. The movable planer bed is indicated at 70 and is driven by the motor 71 through the gearing 72 and rack 73. The drum controller, similar to that shown in Fig. 1 or in Fig. 2, is represented at 74 and the series of electromagnetic switches and starting resistance, etc., of Figs. 1 and 2, are represented as inclosed in the casing 75. It will be understood that the connections of the parts referred to are entirely similar to those of Fig. 1 or Fig. 2. The positive line is connected to the two contacts 76, 77. From contact 78 extends a connection through the coil 79 to negative line and from contact 80 extends a connection through coil 81 to negative line. The cores 82 and 83 of coils 79 and 81 are attached to opposite ends of a lever 84 pivoted at 85. This lever carries projecting pins 86, 87 which are adapted to engage opposite ends of the reversed pendulum 88 also pivoted at 85. The lower end of the pendulum engages the projections of a Y lever 89 pivoted at 90. A rod 91 connects the opposite end of lever 89 to the operating arm of the drum controller, 74. A dash pot 92 is connected to the lever 89 and may be adjusted to retard the movement of lever 89 to any desired amount. The movable bed 70 carries two switch blades 93, 94.

The operation is as follows: Assume that the bed 70 is moving to the right. When the blade 94 engages the contacts 77 and 80, current passes from the positive line through coil 81 to negative line. Its core 83 will then be drawn downwardly and pin 86 engaging the weighted lever 88 will throw it past the central position. The lever 89 will then be thrown and the dash pot will permit the gradual movement of the drum controller. This will cause the motor to be rapidly retarded, reversed and accelerated as explained in connection with Figs. 1 and 2. The planer will then be driven in the opposite direction until switch blade 93 engages contacts 76, 78, when coil 79 will be excited and core 82 will be drawn downwardly. Pin 87 will then act to throw lever 88 past the central position and the controller 74 will be operated as before to cause the motor to be gradually retarded, reversed and accelerated. The controller is arranged so as to insert much higher resistance in the field circuit on return stroke when the load is light than on the forward or cutting stroke. The return stroke will therefore be much faster. While Fig. 1 shows electromagnetic switches 17, 18, 21 and 22 for closing the main circuit, it will be understood that these may be dispensed with in the application shown in Fig. 3, and the said main connections may be directly made by the controller 74 at the different positions, unless it is desired to control a plurality of motors from one controller as in Fig. 1.

Fig. 4 illustrates an arrangement in which a single solenoid or electromagnetic device is used to automatically control the amount of resistance in the armature circuit of a motor. The armature of the motor is indicated at 101 and its field may be excited by the usual shunt winding. In circuit with the armature are the resistances 102, 103, 104 and 105 connected to the + and − supply mains. A solenoid is provided having its coil 106 connected to the armature terminals. From its core 107 extends a rod carrying a series of cross pieces 108 of insulating material. These are adapted to engage and raise from their seats a series of weights 109. These weights are in the form of copper washers and have spring contacts 110, which are adapted to engage and make contact with sets of conductors 111. The weights 109, when not raised by the cross pieces 108, rest upon side supports, 112. The cross pieces 108, or the supports 112, are spaced apart suitable distances so that when the core 107 is raised, the upper weight 109 will be raised first and its contacts 110 will engage the upper set of conductors 111. A further upward movement of core 107 will raise the second weight and its contacts will engage the second pair of conductors 111. In the same way further upward movements of core 107 will successively raise the remaining weights. The upper pair of conductors 111 are electrically connected to the terminals of resistance 102 so that when the contacts 110 of the upper weight engages the conductors, the resistance 102 will be short circuited. Similarly the second pair of conductors are connected to the terminals of resistance 103, the third pair to terminals of resistance 104 and the fourth pair to terminals of resistance 105. When the main switch is closed, current will pass to the motor, passing through the starting resistances 102, 103, 104 and 105 and through the motor armature. This current will be sufficient to start the motor and the counter volts generated thereby will gradually increase. When they have reached a predetermined amount, the current in coil 106 will be sufficient to raise the core and upper weight which will short circuit the resistance 102. Further upward movement of core 107 will be prevented by the second cross piece 108 engaging the second weight. As the motor increases its speed, due to cutting out the resistance 102, the counter electromotive force increases, and when it has attained a certain value, the core 107 will be raised a further amount, lifting the second weight and causing the resistance step 103 to be cut out. Similarly the increase in the counter electromotive force will cause the remaining weights to be raised successively and the remaining resistance steps will be automatically cut out. Thus by the use of a single solenoid I obtain the successive cutting out of the various steps of the starting resistance, each step being cut out when the counter electromotive force attains a certain predetermined value. Whenever the current supply is interrupted, the core 107 and weights 109 will fall, and all of the starting resistance will be again placed in the armature circuit.

Having thus described my invention, I declare that what I claim as new and desire to secure by Letters Patent, is—

1. The combination of an electric motor, supply conductors of constant electromotive force, means for varying the potential at one terminal of the motor relatively to that of said supply conductors, and means dependent upon the difference between said potential and the potential of one of the supply conductors for automatically accelerating the motor and dependent upon the difference between said potential and that of the other supply conductor for automatically retarding the motor.

2. The combination of an electric motor, and means for automatically accelerating and retarding the motor, said means comprising one or more automatic switches closed by the counter electromotive force of the motor, the same switch contacts being employed and closed for controlling both the acceleration and retardation of the motor.

3. The combination of an electric motor, and a common means for automatically accelerating and automatically retarding the motor, said means being dependent upon the counter electromotive force of the motor for its automatic action during the automatic acceleration and automatic retardation.

4. The combination of an electric motor, means for automatically accelerating the motor comprising one or more responsive devices connected across the motor terminals and responding to changes in the counter electromotive force of the motor, means for further accelerating the motor by varying the field strength, means for electrically braking the motor by automatically reducing a rheostatic resistance in circuit with the motor armature, and means controlled by the operator for reversing the motor.

5. The combination of an electric motor, means controlled by the counter electromotive force of the motor for automatically accelerating the motor and for automatically retarding the motor controlled by the difference between the source of electromotive force and the counter electromotive force of the motor.

6. The combination of an electric motor, hand controlled means for starting the motor, means independent of the strength of current through the armature for automatically accelerating and for automatically retarding the motor, and hand controlled means for still further accelerating the motor.

7. The combination of an electric motor, hand controlled means for starting the motor, means controlled by the counter electromotive force of the motor for automatically accelerating the same, hand controlled means for further accelerating the motor, means for electrically retarding the motor by automatically reducing a rheostatic resistance in circuit with the motor armature, and means for reversing the motor.

8. The combination of an electric motor, a resistance, means controlled by the operator for automatically cutting out the resistance to accelerate the motor, said means being automatically controlled by said motor, and means controlled by the operator for placing the armature of said motor and said resistance in a local circuit and cutting out at least a part of said resistance for electrically braking the motor.

9. The combination of an electric motor, a resistance having a series of steps in circuit with said motor, means controlled by the motor for automatically cutting out said steps successively to accelerate the motor, and means for changing the connections and placing the said resistance on closed circuit with the armature of the motor so that the said steps are automatically cut out to retard the motor.

10. The combination of an electric motor, a starting rheostat, automatic electromagnetic means for accelerating the motor to a predetermined speed, and hand controlled means for varying the field strength of said motor to further vary the speed, said means being so correlated as to insure their proper relative operation.

11. The combination of an electric motor, a starting rheostat, hand controlled means for connecting said motor and rheostat to the supply circuit, automatic electromagnetic means for cutting out said resistance, and hand controlled means for varying the speed of said motor after the starting resistance has been cut out, said means being so correlated as to insure their proper relative operation.

12. The combination of an electric motor, a starting rheostat, hand controlled means for connecting said motor and starting rheostat to the supply circuit, automatic means for cutting out the starting resistance, hand controlled means for varying the speed of said motor after the starting resistance has been cut out, and means for electrically stopping the motor, said means being so correlated as to insure their proper relative operation.

13. The combination of an electric motor, a starting rheostat, means for connecting said motor and said starting rheostat to the supply circuit, automatic means for cutting out the resistance of the rheostat, hand controlled means for varying the speed of the motor after the starting resistance has been cut out, means for electrically stopping the motor, and means for reversing the motor, said means being so correlated as to insure their proper relative operation.

14. The combination of an electric motor, a starting resistance therefor divided into a series of steps, automatic means controlled by the counter electromotive force of the motor for cutting out the said resistance to accelerate the motor, and means for placing the armature of said motor in a local closed circuit with said resistance and cutting out at least a part of said resistance for braking the motor.

15. The combination of a source of electric energy, an electric motor, a resistance, means for passing a current from the source through the armature of said motor and said resistance, electrically controlled automatic means controlled by the motor for cutting out said resistance to accelerate the motor, and means for placing the armature of said motor on closed circuit with said resistance and cutting out at least a part of said resistance for retarding the motor, said closed circuit being closed independently of said source.

16. The combination of a source of electric energy, a dynamo electric machine, a plurality of steps of resistance in series with the armature of said machine, means for connecting the said resistance and armature to said source for starting said machine as a motor, means for automatically cutting out the said resistance to accelerate the machine, means for connecting the moving armature and said resistance in a local circuit so that the armature generates a current, and means controlled by the machine for automatically cutting out the resistance to retard the armature.

17. The combination of a dynamo electric machine having a field winding energized independently of its armature current, a resistance, means for connecting a winding of said machine and said resistance in circuit for generating a braking current in said circuit, and means controlled by the machine for automatically cutting out said resistance as the speed of the machine is reduced, the last mentioned means comprising a device magnetically moved to cut out said resistance.

18. The combination of a dynamo electric machine, a series of resistances, connections for placing said resistances in circuit with the armature of said machine, means controlled by said armature for controlling said resistances for automatically accelerating the armature of said machine, and connections for placing said resistances in a local circuit with said armature and cutting out at least a part of said resistances for retarding the same.

19. The combination of a dynamo electric machine, a plurality of resistance sections, connections for placing said resistance sections in circuit with the armature of said machine, means comprising a plurality of electro-magnetic switches corresponding respectively to said sections for automatically cutting out said resistance sections to accelerate said armature, for placing said resistance sections in a local circuit with said armature, and for automatically cutting out said resistance sections for retarding the motor.

20. The combination of an electric motor, controlling means for automatically accelerating the motor, said means being controlled by the counter electromotive force of the motor, and means for causing said motor to act as a generator and for causing said controlling means to automatically retard the motor, said retarding action being contrôlled by the difference between the line electromotive force and the electromotive force on the motor.

21. The combination of an electric motor, supply conductors of constant electromotive force, means for varying the potential at one terminal of the motor relatively to that of said supply conductors, and means dependent upon the difference between said potential and the potential of one of the supply conductors for automatically accelerating the motor and dependent upon the difference between said potential and that of the other supply conductor for automatically retarding the motor by automatically reducing the same artificial resistance.

22. The combination of an electric motor, supply conductors of constant electromotive force, means for varying the potential at one terminal of the motor relatively to that of said supply conductors, and means dependent upon the difference between said potential and the potential of one of the supply conductors for automatically accelerating the motor and substantially independent of the amount of current through the motor armature for automatically retarding the motor.

23. The combination of an electric motor, a source of constant electromotive force, a rheostat having a series of steps of resistance in series with the armature of said motor, means for automatically controlling said steps for automatically accelerating the motor, a rheostat for controlling the field strength by successively controlling a plurality of steps of resistance for still further accelerating the motor, said two rheostats being operatively correlated, and means for employing the motor as a generator in connection with at least part of the said armature resistance for braking purposes.

24. The combination of an electric motor, a rheostat in circuit therewith, means responsive to the electrical condition of the motor armature for automatically reducing the resistance of said rheostat to accelerate said motor, and means for causing the motor armature to generate a braking current through said resistance and for cutting out at least a part of said resistance.

25. The combination of a plurality of electric motors, each operatively connected with its corresponding unit of a multiple unit system, a plurality of master controllers corresponding to the units respectively, a series of resistance steps in circuit with the armature of each of said motors, a single controlling means for connecting each of said armatures in circuit with its resistance to start the motors, and independent means responsive to an electromotive force dependent upon the speed of the motor related to each series of resistances for automatically cutting out said resistances to accelerate the motors.

26. The combination of a plurality of electric motors, a starting rheostat for each of said motors, means for simultaneously connecting the motors with the supply circuit, and independent automatic means corresponding to each motor for automatically accelerating and retarding the motors, said means for retarding comprising an element magnetically moved to increase the retardation.

27. In a multiple unit control system, the combination of a plurality of electric motors, a master controller for the motors corresponding to different units of the multiple unit control system, a starting rheostat for each of said motors, means for simultaneously connecting the motors with the supply circuit, independent automatic means corresponding to each motor for automatically accelerating the motors, said means being controlled automatically by the counter-electromotive force of its corresponding motor, and means for retarding the motors by causing them to act as generators.

28. The combination of an electric motor, and a series of resistance steps for retarding the motor, and means dependent upon the counter electromotive force of the motor for automatically and successively controlling said steps, the motor also being accelerated by using at least a part of said resistance.

29. The combination of supply mains, an electric motor, and means for automatically retarding the motor, said means being subjected to the difference between the counter-electromotive force of the motor and the electromotive force of the supply mains.

30. The combination of a source of electric energy, an electric motor, a resistance comprising a plurality of sections, means comprising a plurality of electromagnetic devices corresponding to said sections respectively for automatically and successively affecting each of said sections for accelerating the motor and for placing the armature on closed circuit with said resistance for retarding the motor and successively affecting certain of said sections.

31. The combination of a source of energy, an electric motor, means for varying the potential at one terminal of the armature of said motor, and means subjected to the difference of potential of said terminals and the potential of one of the supply mains for automatically retarding the motor.

32. The combination of supply conductors, an electric motor, and means dependent upon the difference of potential between one terminal of the armature of said motor and one supply conductor for accelerating the motor and subjected to the difference of potential between said terminal and another supply conductor for automatically retarding the motor.

33. The combination of a source of electromotive force, conductors connected therewith having a practically constant electromotive force, an electric motor having one terminal of the armature of said motor connected to one of said conductors, means for obtaining at the other armature terminal of said motor a potential between the potentials of said conductors, and means dependent upon the electromotive force between said other terminal and one of said conductors for automatically accelerating the motor and dependent upon the electromotive force between said other terminal and another of said conductors for automatically retarding the motor.

34. The combination of a source of electromotive force, an electric motor, and automatic controlling means dependent upon the counter-electromotive force of the motor for changing its speed under certain conditions and subjected to another electromotive force for changing its speed in the reverse sense under other conditions.

35. The combination of a source of electric energy, an electric motor, means connecting said motor and said source so as to develop two inversely variable electromotive forces, electro-responsive means for controlling the motor, and means for connecting said electro-responsive means to respond to one of said electromotive forces to control the motor under certain conditions of operation and for connecting said electro-responsive means to respond to the other of said electromotive forces to control the motor under different conditions of operation.

36. The combination of a source of electric energy, an electric motor, electro-responsive controlling means for said motor, and connections such as to subject said responsive means to an increasing electromotive force to accelerate the motor and to an increasing electromotive force to retard the motor.

37. The combination of a source of electric energy, an electric motor, electro-responsive controlling means for said motor, and means for subjecting said responsive means to the counter-electromotive force of the motor for accelerating the motor and to an electromotive force other than that of the motor for retarding the motor.

38. The combination of a source of electric energy, an electric motor, electro-responsive controlling means for automatically retarding the motor, said electro-responsive means being subjected to a variable electromotive force other than that of said motor.

39. The combination of a source of constant electromotive force, means for dividing said constant electromotive force into inversely variable divisional electromotive forces comprising an electric motor, and electro-responsive controlling means for said motor subjected to one of said divisonal electromotive forces for controlling the motor under certain conditions of operation and subjected to another of said divisional electromotive forces for controlling the motor under different conditions of operation.

40. The combination of a source of constant electromotive force, means for dividing said constant electromotive force into a plurality of variable divisional electromotive forces whose sum equals the original electromotive force comprising an electric motor, and means subjected to different divisional electromotive forces for automatically controlling said motor.

41. The combination of a source of electric energy, means for developing different variable electromotive forces comprising an electric motor, and a plurality of electro-responsive devices for controlling said motor, and connections for subjecting said devices to the said different variable electromotive forces.

42. The combination of a source of electric energy, armature controlling means, a plurality of electro-magnetic switches for controlling the armature controlling means of said motor, and means for subjecting the coils of said switches to the electromotive forces upon different devices for controlling the armature controlling means during acceleration and during retardation of the motor respectively.

43. The combination of a source of electromotive force, an electric motor, a controlling resistance, and electro-responsive means subjected to the difference between the impressed electromotive force and the counter electromotive force of the motor for automatically controlling said resistance under certain operating conditions of the motor, and means for employing a part of said resistance for automatically controlling the motor under different conditions of operation.

44. The combination of a source of constant electromotive force, a resistance, an electroresponsive resistance controlling means, said means being responsive to different inversely varying divisional electromotive forces of said constant electromotive force for automatically controlling the resistance.

45. The combination of a dynamo electric machine having a field winding energized independently of its armature current, an energy absorbing means in series with the armature of said machine, and automatic controlling means for causing said absorbing means to automatically control the armature while the armature is absorbing energy and for causing said absorbing means to automatically control the energy and retard the armature while the armature is generating energy, said automatically controlling means comprising a plurality of windings selectively responsive to changes in the electrical condition in the motor armature circuit.

46. In a motor control system, the combination of a motor, and automatic controlling means therefor comprising a set of resistance sections, automatically controlled automatic switches for controlling said resistance sections respectively for accelerating the motor, and means for connecting the motor armature in a dynamic breaking circuit and for including at least a portion of said resistance sections in said circuit.

47. In a motor controller, the combination of a plurality of armature control resistance sections, a plurality of automatic switches for controlling said sections, a plurality of relay switches, one for each of said automatic switches, and a controller for controlling the said switches and for controlling the field strength of the motor and for controlling the motor to cause it to generate a braking current.

48. The combination of an electric motor, electric means for automatically controlling the acceleration of the motor until the full voltage is applied to the motor armature, a main controller for controlling said means and for also controlling the field strength of the motor for controlling the speed of the motor, and a second motor acting upon the same load as the first and provided with similar controlling means and simultaneously controlled by said main controller.

49. The combination of an electric motor, motor controlling means comprising a resistance, a series of electro-magnetic switches automatically closable in succession for removing said resistance from the armature circuit, a master controller for controlling said series of switches and for controlling the strength of the magnetic field of the motor, means for electrically braking the motor, and a second motor having similar automatic controlling means and controlled by the same master controller.

50. The combination of an electric motor, an armature resistance, electro-magnetically controlled means for automatically cutting out said resistance comprising a series of switches, a controller for controlling said means to cause the same to automatically accelerate the motor in either direction desired and for further accelerating the motor by weakening the magnetic field of the motor, and a second motor operating upon the same load as the first and controlled by said controller.

51. The combination of a plurality of electric motors having field windings energized independently of their armature currents, a controller for reversing the connections of said field windings, and a plurality of series of electro-magnetically controlled switches for controlling the armature circuits of said motors respectively, the operative windings of said switches being controlled by said controller.

52. The combination of an electric motor, an armature resistance having a plurality of steps, electromagnetic means for controlling the cutting out of said resistance for automatically accelerating the motor, said electromagnetic means comprising a plurality of short circuiting switches corresponding respectively to said steps, and means for causing said electromagnetic means to cut out said resistance for retarding the motor.

53. A multiple unit control system comprising a plurality of electric motors for driving a plurality of devices respectively, each of said motors having a field winding energized independently of its armature current, a plurality of manual controllers each adapted to control the plurality of devices, and means for causing the automatic acceleration of the motors in unison and for electrically braking the motors.

54. A multiple unit control system, comprising a plurality of units, means for automatically electrically accelerating and automatically electrically retarding said units, and a plurality of means under the control of the operator and corresponding to different units for controlling said first-named means.

55. A multiple unit control system, comprising a plurality of units, a plurality of motors for said units respectively, and a plurality of means located upon different units of the multiple unit control system for similarly and automatically electrically retarding the motors by causing the motors to generate electric energy.

56. The combination of a plurality of electric motors acting upon a common load, and a plurality of means located at different points under the control of an operator for causing the automatic electric acceleration and the automatic electric retardation of the motors.

57. The combination of a plurality of motors acting upon a common load, and means under the control of an operator comprising a plurality of controllers located at different points and each adapted for causing the automatic retardation of the motors, said means comprising means for controlling a field winding of the motors, said field winding being energized independently of the motor armature currents.

58. The method of operating a dynamo electric machine which consists in operating the machine as a motor and controlling its speed by its counter electromotive force, and operating the machine as a generator and controlling its speed by an electromotive force represented by the difference between its own electromotive force and that of another source of electromotive force.

59. The method of operating a dynamo electric machine which consists in causing the same to absorb electric energy, controlling the same while it is absorbing electric energy in accordance with change of its electromotive force, and causing the machine to generate electric energy, and controlling the machine while it is acting as a generator in accordance with the difference between its own electromotive force and that of another source of electromotive force.

60. The method of retarding a motor which consists in magnetically cutting out successively and automatically steps of resistance in series with the motor armature whenever the current falls to a predetermined minimum value, and automatically controlling said cutting out of resistance by changes in the electrical condition of the armature circuit.

61. The method of retarding a motor which consists in magnetically cutting out sufficient resistance when the current falls to a predetermined minimum value to cause the current to rise to a predetermined maximum value, and when the current has again fallen to the predetermined minimum value cutting out an amount of resistance sufficient to cause the current to rise to the predetermined maximum value and controlling the cutting out of the resistance by a current different from that through the resistance.

62. The method of controlling a plurality of electric motors acting upon a common load which consists in similarly increasing the volts upon each of the motor armatures by similarly controlling a plurality of controlling means in series with said armatures respectively, then weakening the magnetic field of the motors to accelerate the motors, and causing said motors to generate electric energy to retard the load.

63. In combination, a motor having a field winding energized independently of its armature current, a source of current supply, a resistance, an operating member for alternately causing the connection of the armature of said motor to said source of supply for operation as a motor with said resistance in circuit and as a generator with the armature short circuited through said resistance, and an electromagnetic device controlled by said operating member for automatically cutting out said resistance by a movement in one direction when the motor is operating as a motor and by a movement in the same direction when operating as a generator.

64. The method of controlling electric trains made up of a plurality of vehicles which comprises leading current upon each of a plurality of vehicles of a train, supplying current to a circuit upon each vehicle containing a motor armature and its resistance, supplying another current to a field winding of each of said motor armatures, cutting out the resistance in each of said circuits to accelerate the train, and causing the motors to act as generators of energy used to retard the train.

In testimony whereof I affix my signature in presence of two witnesses.

H. WARD LEONARD.

Witnesses:
L. K. SAGER,
JULIAN S. WOOSTER.